United States Patent
Nadjafi

[19]

[11] Patent Number: 6,135,640
[45] Date of Patent: Oct. 24, 2000

[54] HYBRID FOIL/MAGNETIC BEARING

[75] Inventor: Robert H. Nadjafi, San Pedro, Calif.

[73] Assignee: AlliedSignal Inc., Morristown, N.J.

[21] Appl. No.: 08/858,483

[22] Filed: May 16, 1997

Related U.S. Application Data

[63] Continuation of application No. 08/497,245, Jun. 30, 1995, abandoned.

[51] Int. Cl.[7] .............................. F16C 17/02; H02K 7/09
[52] U.S. Cl. ................................. 384/103; 310/90.5
[58] Field of Search ............................ 310/90.5; 384/103, 384/104, 105, 106

[56] References Cited

U.S. PATENT DOCUMENTS

| | | | |
|---|---|---|---|
| 4,445,792 | 5/1984 | Trippett | 384/103 |
| 4,795,274 | 1/1989 | Gu | 384/106 |
| 4,815,864 | 3/1989 | Jones | 384/103 |
| 4,818,123 | 4/1989 | Gu | 384/106 |
| 4,871,267 | 10/1989 | Gu | 384/105 |
| 5,116,143 | 5/1992 | Saville et al. | 384/106 |
| 5,126,611 | 6/1992 | Armstrong et al. | 310/90.5 |
| 5,130,588 | 7/1992 | Armstrong et al. | 310/90.5 |
| 5,196,748 | 3/1993 | Rigney | 310/90.5 |
| 5,220,232 | 6/1993 | Rigney, II et al. | 310/90.5 |
| 5,228,785 | 7/1993 | Savilk et al. | 384/103 |
| 5,270,601 | 12/1993 | Rigney, II | 310/90.5 |
| 5,272,403 | 12/1993 | New | 310/90.5 |
| 5,519,274 | 5/1996 | Scharrer | 310/90.5 |
| 5,714,818 | 2/1998 | Eakman et al. | 310/90.5 |

FOREIGN PATENT DOCUMENTS

| | | |
|---|---|---|
| 0 104 083 | 3/1984 | European Pat. Off. . |
| 2 348 394 | 11/1977 | France . |

*Primary Examiner*—Nick Ponomarenko
*Assistant Examiner*—Karl I. Tamai
*Attorney, Agent, or Firm*—William J. Zak, Jr., Esq.

[57] ABSTRACT

A cylindrical shaft including a rotor rotates within a housing. A foil bearing comprised of flexible foil segments encircles the rotor, and is located in between the rotor and the housing. The foil segments are attached to the housing, and are installed with a flexion to press against the rotor. A split ring is situated near each end of the foil bearing. Each ring is suspended in an circumferential groove in the rotor by springs which also apply a force tending to keep the ring closed. When the rings are closed, the foil segments can press against and support the rotor. The rings can be opened by respective solenoid-operated plungers to press against the foil segments and force them apart from the rotor.

14 Claims, 5 Drawing Sheets

HYBRID FOIL/MAGNETIC BEARING

This application is a continuation of application Ser. No. 08/497,245 filed Jun. 30, 1995, now abandoned.

FIELD OF INVENTION

This invention relates generally to bearings for turbomachinery such as can be used for automotive engine applications such as high speed turboalternators and or turbogenerators and more particularly the present invention is directed to a hybrid foil and magnetic bearing.

BACKGROUND

Present-day foil bearing and magnetic bearing technologies are fully matured and separately have been utilized in a wide variety of high speed turbomachinery. Both types of bearings have significant advantages compared to conventional bearings (ball bearing and hydrostatic bearing). One major advantage is that they do not require an external lubrication system, which leads to a more robust and reliable system.

Magnetic bearings, however, require back up bearings to support the rotor and to prevent damage in the event of electrical power disruption or when the unit is in transit.

Foil bearings are an excellent choice as backup bearings for applications where very low bearing start torque and power loss are required.

SUMMARY OF THE INVENTION

It is a principle object of this invention to provide an improved bearing having the high speed, operating characteristic of a foil bearing and the low torque characteristic of a magnetic bearing.

A hybrid magnetic and foil bearing in accordance with the present invention can comprise a substantially cylindrical shaft with a magnetic bearing position around the shaft. The shaft is rotably posotioned in a housing. The magnetic bearing can comprise a cylindrical rotor mounted on the shaft, an annular stator attached to the housing and an air gap situated therebetween. A plurality of foil bearing segments can be inserted removeably within the air gap and fixedly positioned with respect to the housing by retaining tabs. A spring bias means can be positioned between the foil bearing segments and the magnetic bearing or stator for improved load capacity. Two engagement/disengagement rings are located respectively in circumferential grooves in the rotor. They restrain the foil segments from contacting the rotor during magnetic bearing operation. A mechanical means coupled to each engagement/disengagement ring can be provided to urge the foil bearing into the air gap to engage and support the rotor when the magnetic bearing is not operating.

BRIEF DESCRIPTION OF THE DRAWINGS

Other objects and features of preferred embodiments of the present invention will be apparent from the following detailed description taken in connection with the accompanying drawings in which.

DESCRIPTION OF THE INVENTION

Figure 1:
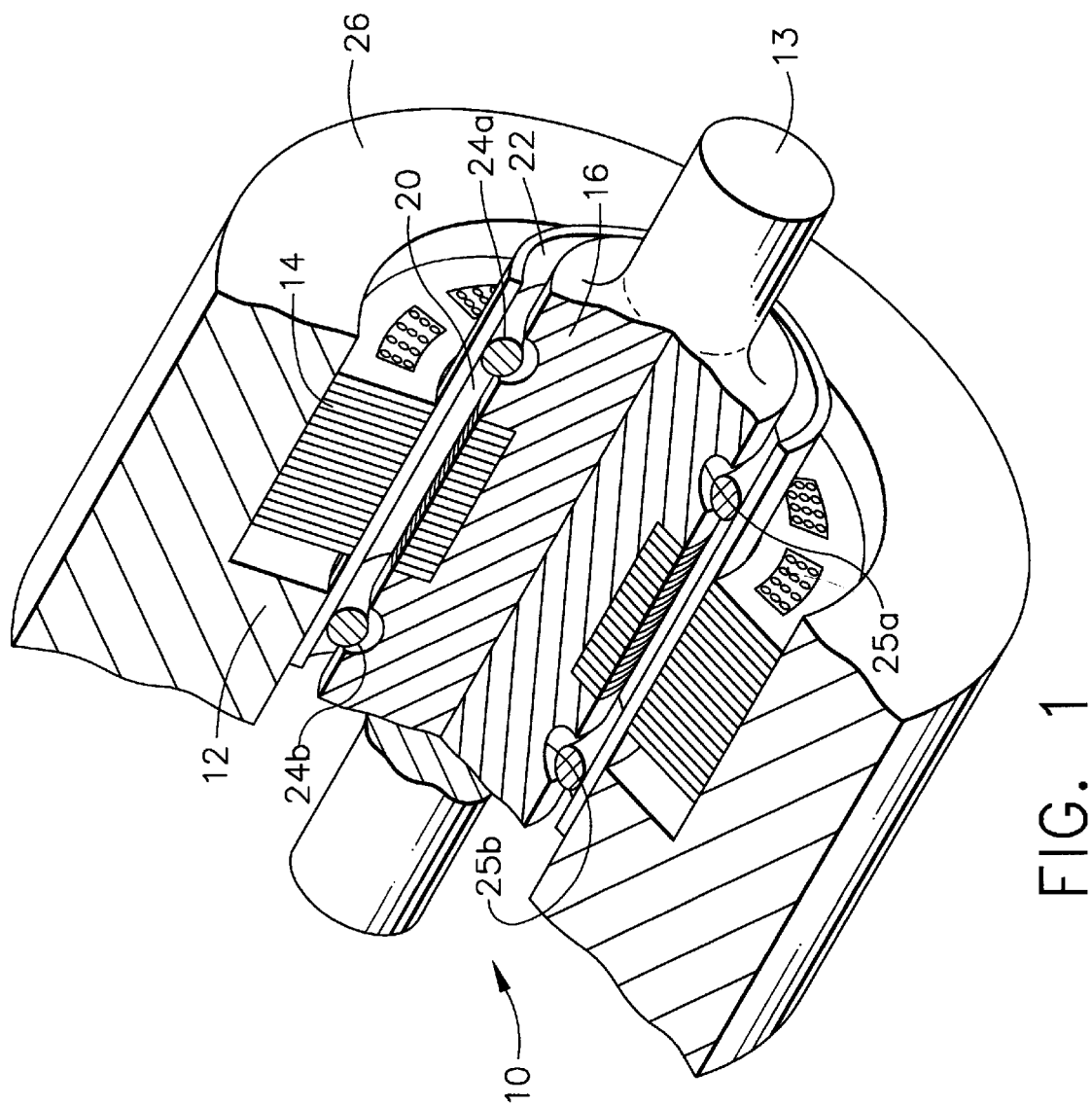
FIG. 1 is an illustration of a preferred embodiment of the hybrid foil/magnetic bearing of the present invention.

FIG. 1 shows a cut away view of a hybrid foil/magnetic bearing 10 in accordance with the present invention. The magnetic bearing 12 can comprise a stator 14 and a rotor 16 disposed in rotational relation with respect to each other with an air gap 20 disposed therebetween. The magnetic bearing can be disposed around a shaft 13. A foil bearing 22 can be installed within the air gap 20 between stator 14 and the rotor 16 to provide a bearing 10 exhibiting improved efficiency. Preferably, the foil bearing 22 can be engaged or disengaged by activation/retraction rings 24a and 24b respectively located in circumferential grooves 25a and 25b. Although rings 24a and 24b of hybrid foil/magnetic bearing 10 have approximately circular cross-sections, they may have noncircular cross-sections in alternative embodiments of the present invention. The hybrid magnetic bearing 10 can be enclosed in a housing 26.

Figure 2:
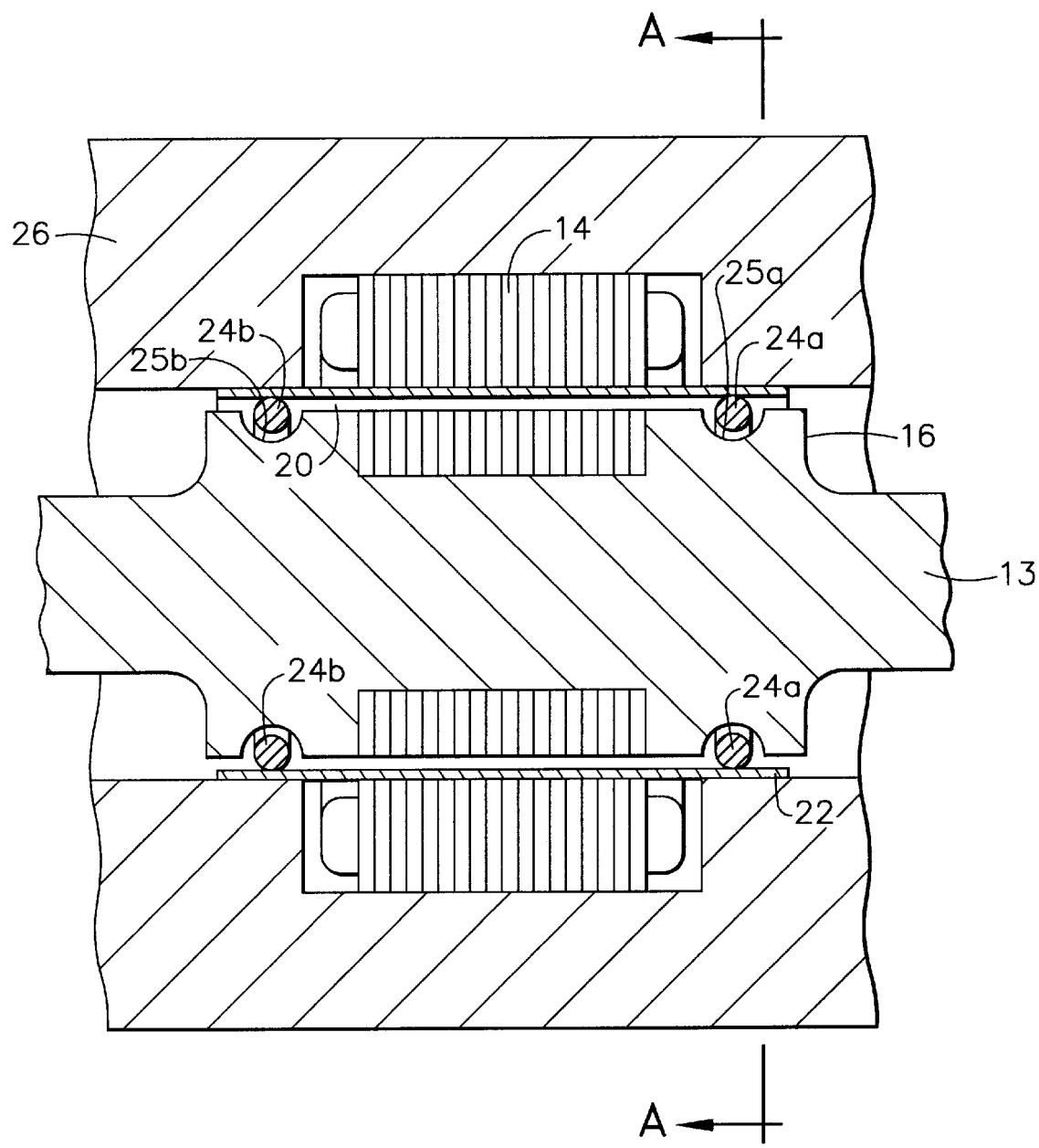
FIG. 2 is a cross-section illustration of the hybrid bearing of the present invention.

FIG. 2 is a cross-section illustration of the hybrid bearing 10 showing the foil bearing activation/retraction (engagement/disengagement) rings 24a and 24b at the ends of the magnetic bearing.

The foil bearing 22 can comprise a predetermined number of overlapping foil segments, having semi-cylindrical shape for conforming to the curvature of the rotating shaft 13. The foil bearing segments can be made of a non-magnetic material and are preferably spring loaded into the air gap between rotor and stator. Spring loading can be achieved by inserting the foil bearing segments into housing 26 by flexibly decreasing their radius of curvature to form a tubular opening for rotor 16 having a diameter or width less than the diameter of rotor 16. Thus, when rotor 16 is inserted into the aforementioned tubular opening during the assembly of bearing 10, the foil segments press against it. In addition, a set of springs can be provided beneath the foil 22 adjacent to the stator 12. The foil bearing activation/retraction rings 24a and 24b are respectively situated in circumferential grooves 25a and 25b formed in the rotor 16.

Figure 3:
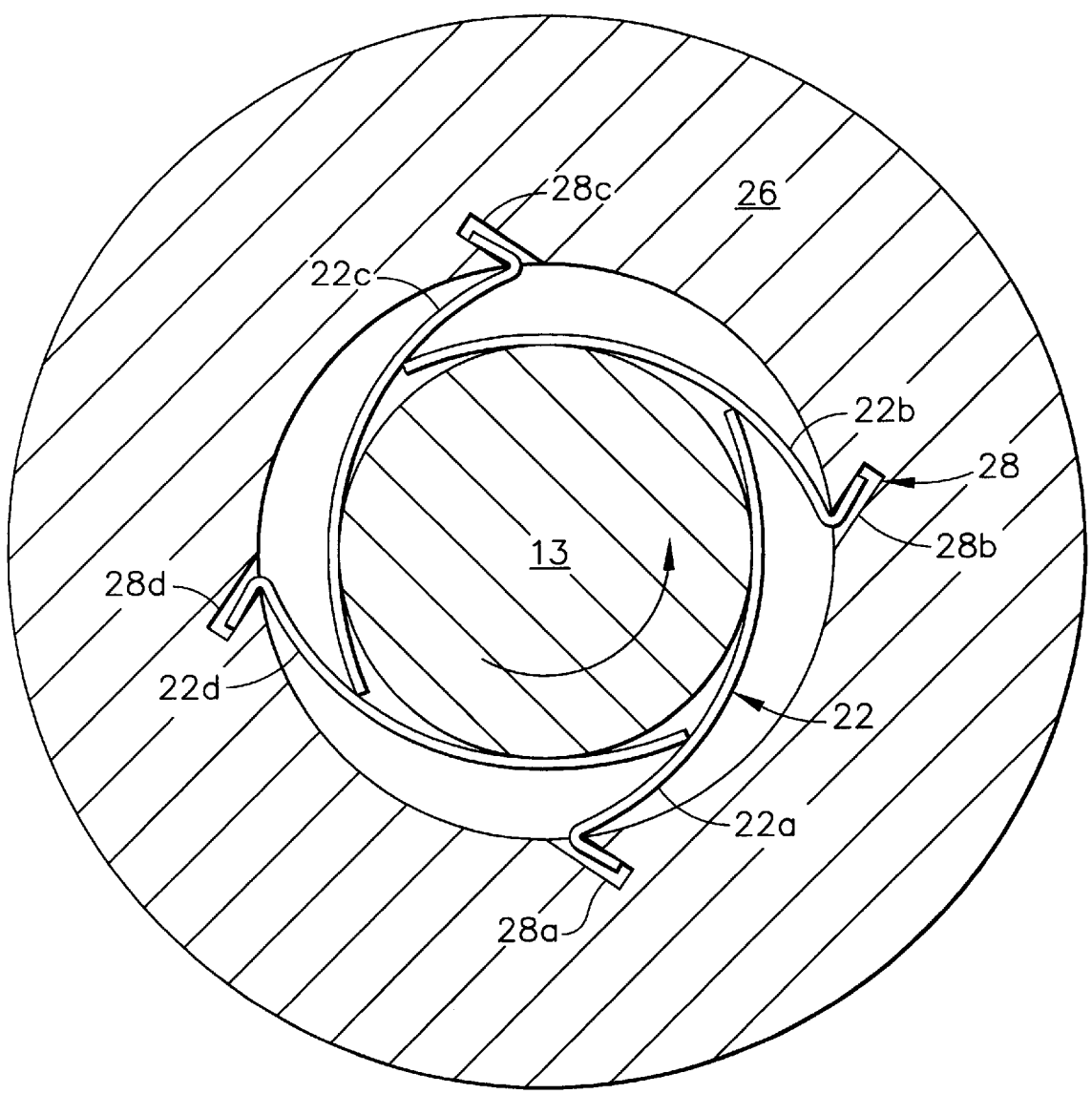
FIG. 3 is an enlarged cross-sectional end view illustration of the of the hybrid bearing of the present invention as shown in FIG. 2 and taken along line A—A.
Figure 4:
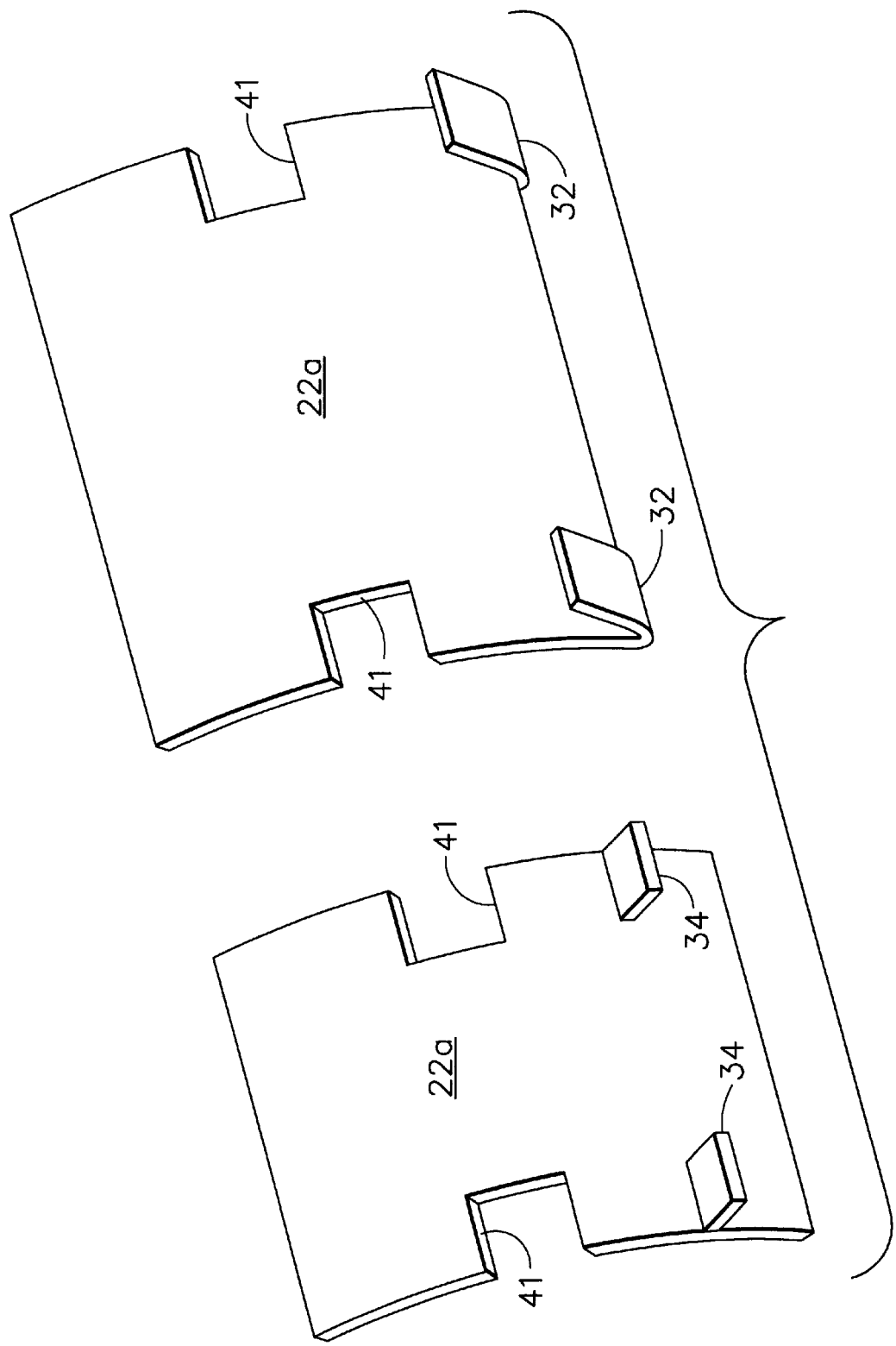
FIG. 4 is an illustration of the foil bearing segments showing the anchoring tabs and bars.

Referring now to FIGS. 3 and 4 in combination, the foil bearing 22 can be comprised of a plurality of foil segments 22a, 22b, 22c and 22d which taken together substantially surround or encircle the rotor 16. Each of the foil segments extend for almost the entire length of rotor 16. As is shown in FIG. 4 the foil bearing 22 can have anchoring tabs 32 articulated from an edge. Alternatively the anchor bars 34 can be positioned on the surface of the foil bearing 22 facing housing 26. The tabs 32 or anchors 34 can be inserted within respective anchor slots 28 in housing 26 to fixedly position the foil bearing 22 with respect to rotor 16. An enlarged cross sectional end view illustration of the foil segments 22 as installed in the unit is shown in FIG. 3. The foil bearing segments 22a, 22b, 22c and 22d are shown positioned in retaining slots 28a, 28b, 28c and 28d respectively situated in housing 26.

Figure 5:
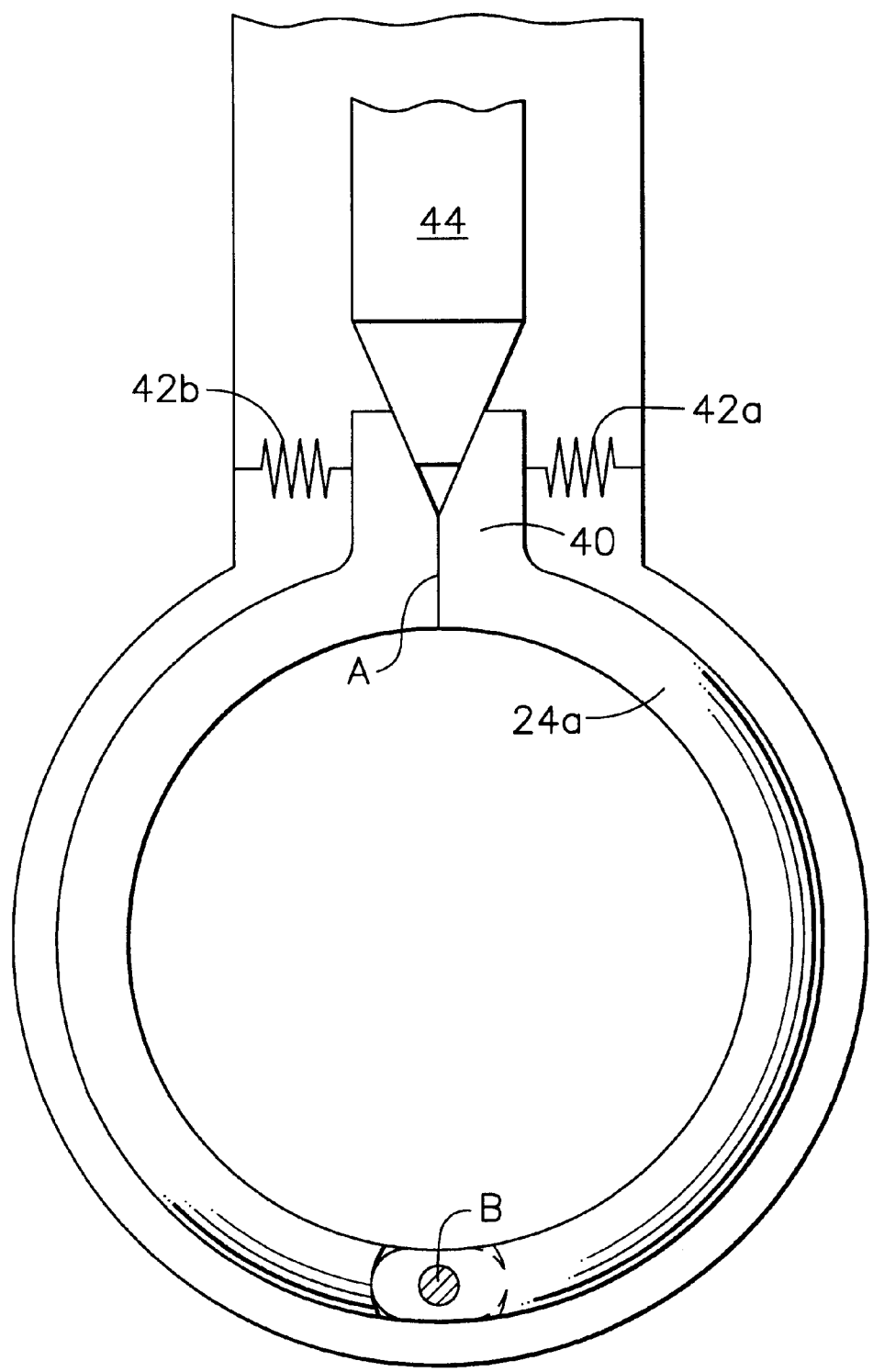
FIG. 5 is a schematic illustration of the foil bearing engagement/disengagement ring that can be located near each end of the magnetic bearing of the present invention.

The geometric configuration of the foil segments showing the anchoring tabs 32 or bars 34 at the two ends is depicted in FIG. 4. FIG. 5 shows a schematic of the foil bearing engagement/disengagement ring 24a that is located near right end of the magnetic bearing 10 (in reference to FIGS. 1 and 2). To ensure proper balance at least two identical rings 24a and 24b are used for each bearing 10. The ring is split at location "A" and riveted at location "B" that is preferably 180 degrees from "A".

Extensions 40 are an integral part of ring 24a, and are formed on either side of ring location "A" where ring 24 is split. Extensions 40 pass through a cutout 41 in foil segment 22a of foil bearing 22. Springs 42a and 42b attach extensions 40, and thus ring 24a, to housing 26. Springs 42a and 42b are sufficiently stiff to suspend ring 24a in circumferential groove 25a.

Extensions 40 are shown abutting each other so that ring 24 is in its closed configuration. Ring 24a has its minimum circumference when it is closed and, except for extensions 40, lies entirely within circumferential groove 25a. In its closed configuration, that is, when ring 24a does not protrude out of circumferential groove 25a and into air gap 20, ring 24a does not contact the segments of foil bearing 22 and allows foil bearing 22 to be engaged and support rotor 16.

Springs 42a and 42b are in compression in FIG. 5, and thus apply respective opposing forces against extensions 40 tending to keep ring 24a closed. A mechanical means, for example, plunger 44 moving centrically (downwards in reference to FIG. 5) responsive to the magnetic force field generated by a solenoid, can overcome the opposing forces of springs 42a and 42b and open ring 24a. A V-shaped cutout at location "A" is provided for the alignment and seating of plunger 44.

FIG. 5 shows plunger 44 in the position for which there is no current to the driving solenoid, i.e., its deactuated position. When the solenoid is actuated, plunger 44 is forced towards the center of rotor 16, in between extensions 40. This movement overcomes the opposing forces of springs 42a and 42b, drives extensions 40 apart, and increases the circumference of ring 24a to its maximum at the furthest extent of the centric movement of plunger 44, that is, when the maximum diameter or width of plunger 44 is located in between extensions 40. When ring 24a is opened to its maximum circumference, it protrudes outside of circumferential groove 25a and into air gap 20. This open configuration brings ring 24a into contact with the segments of foil bearing 22, forcing the foil segments away and disengaging them from rotor 16.

During normal operation, the respective solenoids for plungers 44 remain actuated by a portion of the electrical power generated by the unit which includes magnetic bearing 12. This keeps rings 24a and 24b opened to their maximum circumference, and thus keeps foil bearing 22 disengaged. When the unit including magnetic bearing 12 is not operating, for example, in the event of an electrical power interruption, the solenoids for plungers 44 are deactuated and foil bearing 22 becomes engaged and supports shaft 13.

While a preferred embodiment of the present invention has been illustrated and described, it should be apparent to those skilled in the art that numerous modifications in the illustrated embodiment can be readily made. For instance, this structure can be applied to a variety of non magnetic material can be used for the foil bearings; the thickness of the materials can be altered; length and configuration of the foils and magnetic bearings can be configured to provide improved resistance to torsional and vibrational stress and improved durability.

What is claimed is:

1. A foil bearing which can be engaged and disengaged, for supporting a rotatable shaft, comprising:

a cylindrical shaft being rotatably disposed within a housing;

a foil bearing encircling the shaft and situated in between the shaft and the housing;
said foil bearing being fixedly attached to the housing, whereby
the shaft rotates relative to said foil bearing;
said foil bearing being for applying a radial force against the shaft in the absence of restraint;

a ring having an adjustable circumference encircling the shaft and situated in between the shaft and said foil bearing;
said ring having a disengagement circumference which restrains said foil bearing from applying the radial force against the shaft, and an engagement circumference less than said disengagement circumference which allows said foil bearing to apply the radial force against the shaft; and engagement means for adjusting the ring circumference, whereby
said foil bearing is restrained from applying the radial force against the shaft while said engagement means is actuated, and is allowed to contact the shaft and apply the radial force when said engagement means is deactuated.

2. The foil bearing as defined in claim 1 wherein said ring is situated in a circumferential groove in the shaft.

3. The foil bearing as defined in claim 1 wherein:

said foil bearing is comprised of flexible foil segments; and said segments are biased to apply the radial force against the shaft in the absence of restraint.

4. The foil bearing as defined in claim 3 wherein:

the shaft has a shaft diameter;

said foil segments form a tube having an inner diameter; and said inner diameter being less than the shaft diameter in the absence of an opposing force, whereby
said segments are biased.

5. The foil bearing as defined in claim 4 wherein said ring is located in a circumferential groove in the shaft.

6. The foil bearing as defined in claim 4 further comprising:

a split in said ring;

the adjustable circumference being increased when said ring is opened at said split;

spring means for applying a spring force tending to keep said ring closed at said split; and said engagement means being comprised of
a plunger for opening said ring at said split when said plunger is inserted into said split, and
solenoid means for forcing said plunger into said split and overcoming said spring force to achieve said disengagement circumference when said engagement means is actuated, whereby
when said solenoid means is deactuated said ring remains closed in said engagement circumference, and said foil segments are engaged and the radial force is applied to the shaft, and
when said solenoid means is actuated said ring is opened to said disengagement circumference, and said foil segments are disengaged and restrained from contacting the shaft and applying the radial force.

7. The foil bearing as defined in claim 6 wherein said foil segments overlap and are in contact with each other.

8. The foil bearing as defined in claim 7 wherein:

said shaft includes a rotor; and said housing includes a stator, whereby said rotor and housing comprise a magnetic bearing.

9. The foil bearing as defined in claim 8 further comprising:

the magnetic bearing being powered by a power source; and the power source also being for actuating said solenoid means whereby said solenoid means is deactuated and said foil segments are engaged in the absence of power being supplied by the power source to the magnetic bearing.

10. The foil bearing as defined in claim 9 wherein:

the shaft has a shaft diameter;

said foil segments form a tube having an inner diameter; and said inner diameter being less than the shaft diameter in the absence of an opposing force, whereby said segments are biased.

11. The foil bearing as defined in claim 10 wherein:

each of said foil segments has a surface facing the housing, and includes anchor bars projecting from said surface; and the housing includes anchor grooves for receiving said anchor bars.

12. The foil bearing as defined in claim 10 wherein:

each of said foil segments has an edge and an anchor tab extending from said edge; and the housing includes anchor grooves for receiving said anchor tabs.

13. A method for engaging and disengaging a foil bearing for a shaft rotatably disposed in a housing, comprising the steps of:

inserting a foil bearing into the housing so that the foil bearing applies a radial force against the shaft when the foil bearing is engaged;

forming a circumferential groove in the shaft;

splitting a ring at a split location so that said ring has an adjustable circumference, including an engagement circumference in which said ring does not contact said foil bearing and a disengagement circumference greater than said engagement circumference, in which said ring presses against said foil bearing;

suspending said ring in said circumferential groove by spring means tending to keep said ring in said engagement circumference;

placing a plunger adjacent to said split location; and attaching mechanical means to said plunger for forcing said plunger into said ring at said split location and forcing said ring into said disengagement circumference.

14. The method for engaging and disengaging a foil bearing as defined in claim 13 further comprising:

providing a magnetic bearing for suspending the shaft in the housing; and powering the magnetic bearing and said mechanical means from a common power source.

\* \* \* \* \*